(12) United States Patent
Cuffaro

(10) Patent No.: US 11,974,695 B1
(45) Date of Patent: May 7, 2024

(54) NESTING PREPARATION TABLE FOR COLLAPSIBLE COOKING STOVES

(71) Applicant: Daniel F. Cuffaro, Lakewood, OH (US)

(72) Inventor: Daniel F. Cuffaro, Lakewood, OH (US)

( * ) Notice: Subject to any disclaimer, the term of this patent is extended or adjusted under 35 U.S.C. 154(b) by 371 days.

(21) Appl. No.: 17/193,217

(22) Filed: Mar. 5, 2021

Related U.S. Application Data

(63) Continuation-in-part of application No. 16/775,935, filed on Jan. 29, 2020, now Pat. No. 11,181,278, which is a continuation-in-part of application No. 15/433,204, filed on Feb. 15, 2017, now Pat. No. 10,598,384.

(60) Provisional application No. 62/798,279, filed on Jan. 29, 2019, provisional application No. 62/295,789, filed on Feb. 16, 2016.

(51) Int. Cl.
*A47J 33/00* (2006.01)
*A47J 37/07* (2006.01)

(52) U.S. Cl.
CPC ........... *A47J 33/00* (2013.01); *A47J 37/0713* (2013.01); *A47J 37/0763* (2013.01); *A47J 2037/0777* (2013.01)

(58) Field of Classification Search
CPC .... A47J 33/00; A47J 37/0713; A47J 37/0763; A47J 2037/0777
See application file for complete search history.

(56) References Cited

U.S. PATENT DOCUMENTS

| | | | | |
|---|---|---|---|---|
| 3,809,051 | A * | 5/1974 | Giroux | A47J 37/0745 126/25 R |
| 3,982,524 | A * | 9/1976 | Diggs | A01G 13/06 431/353 |
| 4,759,276 | A * | 7/1988 | Segroves | A47J 37/0713 126/41 R |
| 4,962,697 | A * | 10/1990 | Farrar | A47J 37/0731 99/449 |
| 6,302,097 | B1 * | 10/2001 | Rivera | |
| 10,598,384 | B2 * | 3/2020 | Cuffaro | A47J 37/0763 |
| 11,181,278 | B2 * | 11/2021 | Cuffaro | F24C 3/085 |
| 2004/0000303 | A1 * | 1/2004 | Regen | A47J 37/0731 126/25 R |

* cited by examiner

*Primary Examiner* — Alfred Basichas
(74) *Attorney, Agent, or Firm* — Gugliotta & Gugliotta, LPA

(57) ABSTRACT

A preparation table formed of a prep surface having one or more frames secured to the prep surface. A plurality of legs are rotatably secured to the one or more frames. The legs and frames are configured to nest with a collapsible stove such that the overall thickness of the collapsible stove is increased substantially only by a thickness of the prep surface.

6 Claims, 12 Drawing Sheets

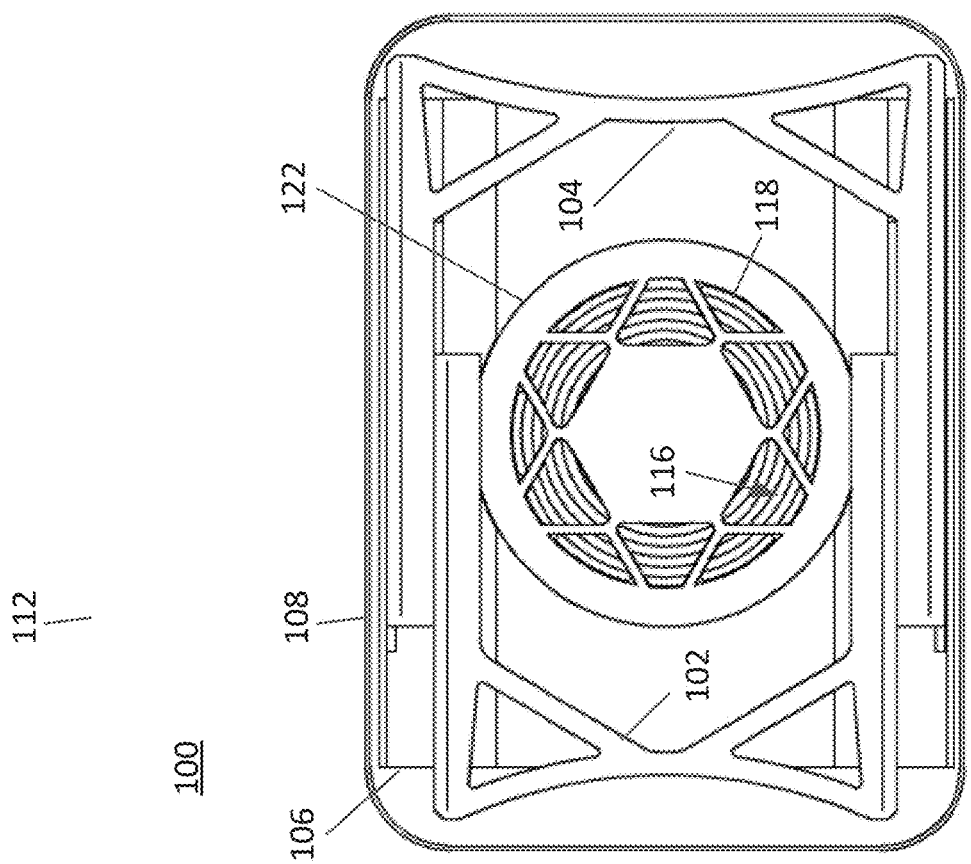
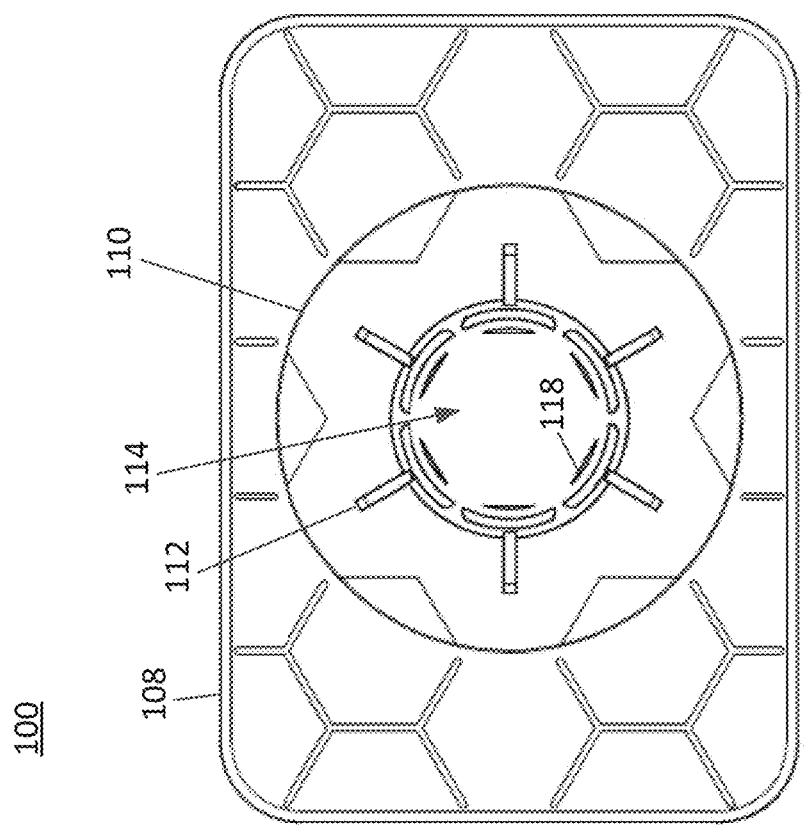

NESTING PREPARATION TABLE FOR COLLAPSIBLE COOKING STOVES

BACKGROUND OF THE INVENTION

1. Field of the Invention

This application relates generally to camping cooking equipment and, more particularly, to a preparation table that nests with a collapsible cooking stove.

2. Description of the Related Art

People participate in outdoor recreational activities such as camping. Campers often build fires for warmth and for cooking. A cooking stove can be used to direct and concentrate flames and heat onto cooking containers such as pots, pans, or plates. A preparation table can be used in preparing food to be cooked, as a resting place for utensils during cooking, or afterwards as a table for eating the prepared food. However, separate preparation tables generally take up valuable space in a camper's backpack.

SUMMARY OF THE INVENTION

It is thus an object of the present invention to provide a lightweight collapsible food preparation table.

It is a feature of the present invention to provide such a preparation table that nests in a compact configuration with a cooking stove having a collapsible combustion chamber.

The present invention provides a preparation table formed of a prep surface having one or more frames secured to the prep surface. A plurality of legs is rotatably secured to the one or more frames. The legs and frames are configured to nest with a collapsible stove such that the overall thickness of the collapsible stove is increased substantially only by a thickness of the prep surface. The collapsible stove includes a combustion chamber configured to burn a combustible material having a plurality of tapered annular rings configured to telescope to form the combustion chamber when the collapsible stove is in an open configuration and collapse into a nested configuration when the collapsible stove is in a collapsed configuration. A top plate displaced over the combustion chamber. The top plate has an aperture open to the combustion chamber, and is configured to support a cooking container over the aperture.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3A is a top view of a collapsible stove according to an embodiment of the disclosure;

FIG. 3B is a bottom view of the collapsible stove of FIG. 3A in a collapsed configuration according to an embodiment of the disclosure;

DESCRIPTION OF THE PREFERRED EMBODIMENTS

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

The best mode for carrying out the invention is presented in terms of its preferred embodiment, herein depicted within the Figures.

1. DETAILED DESCRIPTION OF THE FIGURES

Figure 1A:
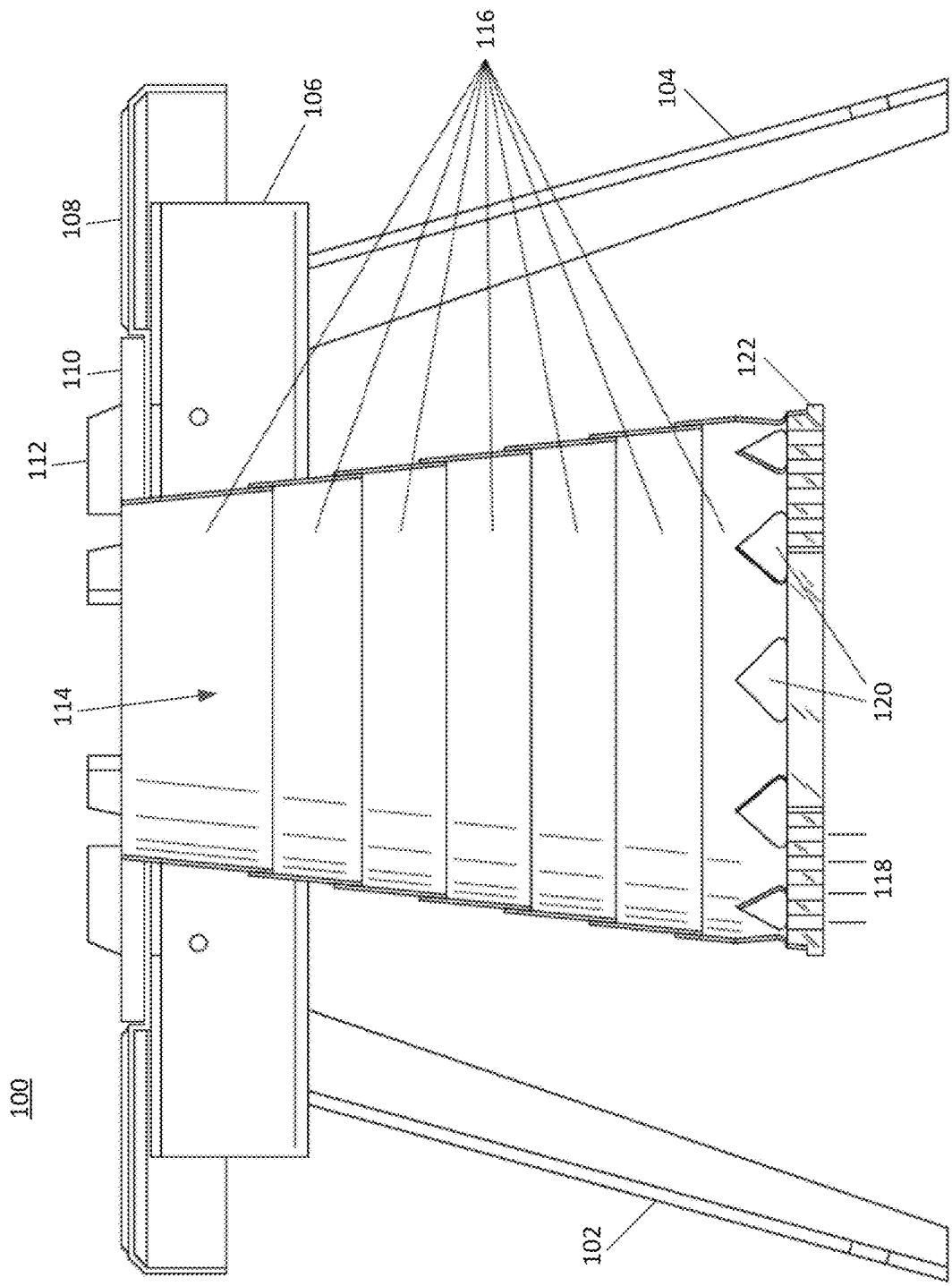
FIG. 1A is a section view of a collapsible stove in an opened configuration according to an embodiment of the disclosure.
Figure 1B:
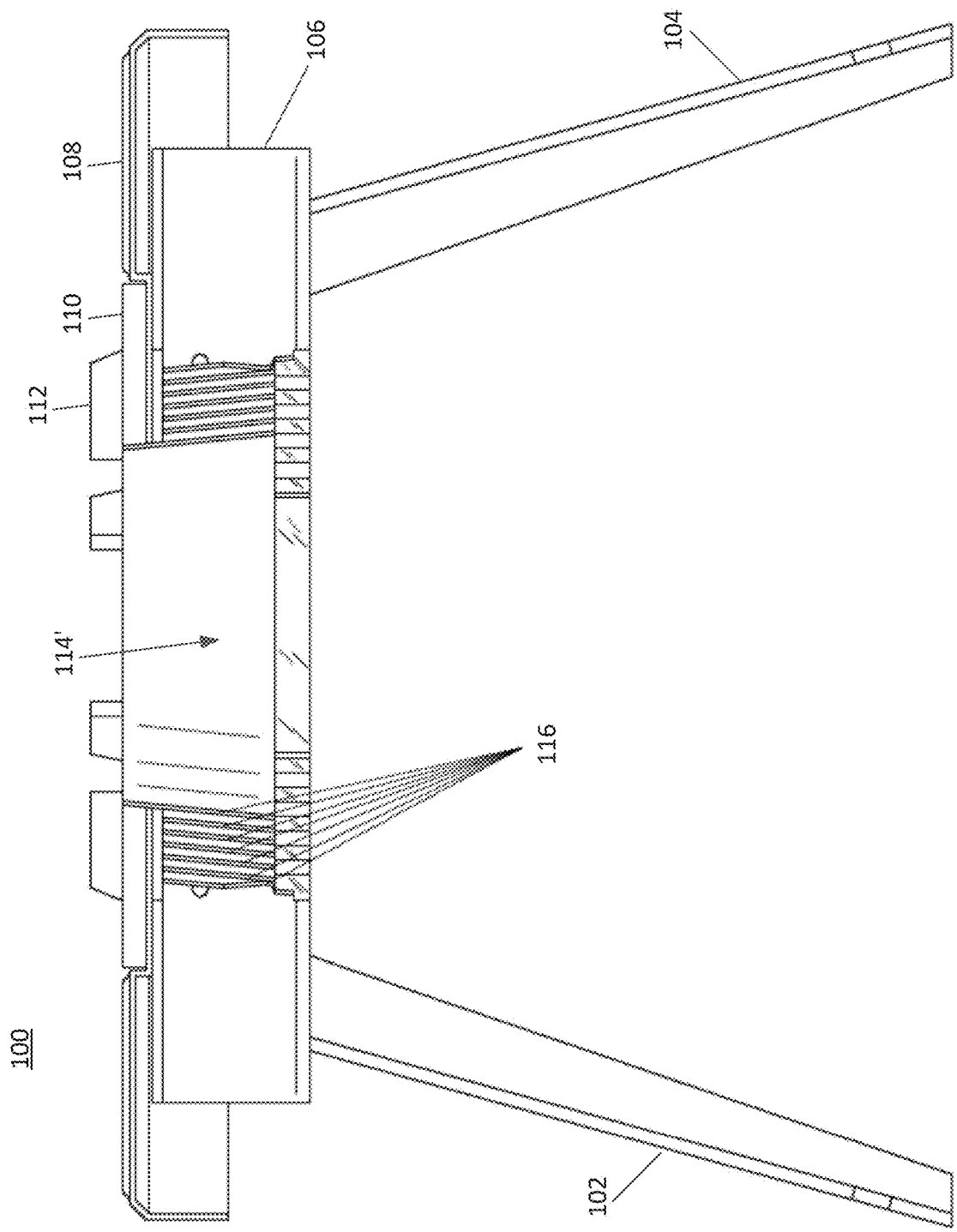
FIG. 1B is a section view of the collapsible stove of FIG. 1A in a partially collapsed configuration according to an embodiment of the disclosure.
Figure 1C:
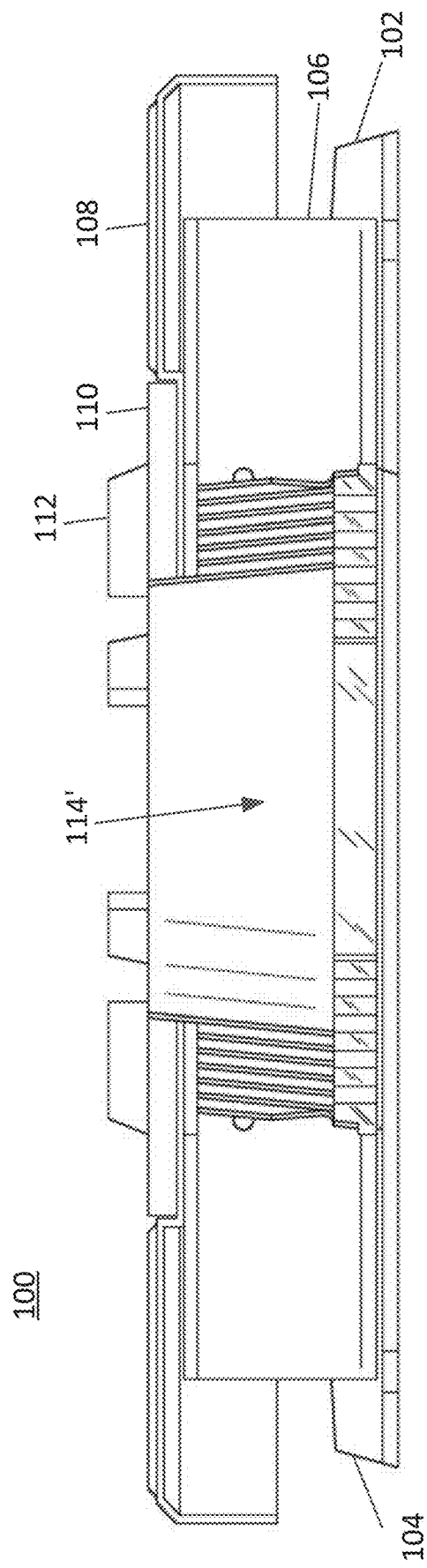
FIG. 1C is a section view of the collapsible stove of FIG. 1B in a fully collapsed configuration according to an embodiment of the disclosure.

Referring to FIGS. 1A, 1B, and 1C, illustrated is an example embodiment of a collapsible stove 100. FIG. 1A illustrates a section view of the collapsible stove 100 in the fully open configuration. FIG. 1B illustrates a section view the collapsible stove 100 in a partially open configuration. FIG. 1C illustrates a section view the collapsible stove 100 in the fully collapsed configuration. The collapsible stove 100 comprises a first leg 102, a second leg 104, a frame 106, a top cover 108, a top plate 110, and a collapsible combustion chamber 114.

The legs 102, 104 can attach to a frame 106 via a rotatable pivot point, allowing the legs 102, 104 to be opened in order to suspend the frame 106, surface 108, top plate 110, and combustion chamber 114 above the ground. In a configuration, each of the legs 102, 104 can rotate more than ninety degrees to provide stable support of the frame 106. In a configuration, the legs 102, 104 can be configured to stop rotating once part of the legs 102, 104 abuts part of the frame 106. In another configuration, the legs 102, 104 and frame 106 can be configured to increase friction between members as the legs 102, 104 are rotated into the open position. In another configuration, detents such as protrusions or indents in the frame 106 and/or legs 102, 104 can limit rotation or secure the legs 102, 104 in the open position as would be understood in the art. The legs 102, 104 can be secured similarly in the closed position. In a configuration, clevis pins or other types of removable connectors can be used to secure the legs 102, 104 to the frame 106, while facilitating easy removal for cleaning or replacement. In other embodiments, fixed legs, telescoping legs, or multi-part legs can be used as would be understood in the art.

Figure 6B:
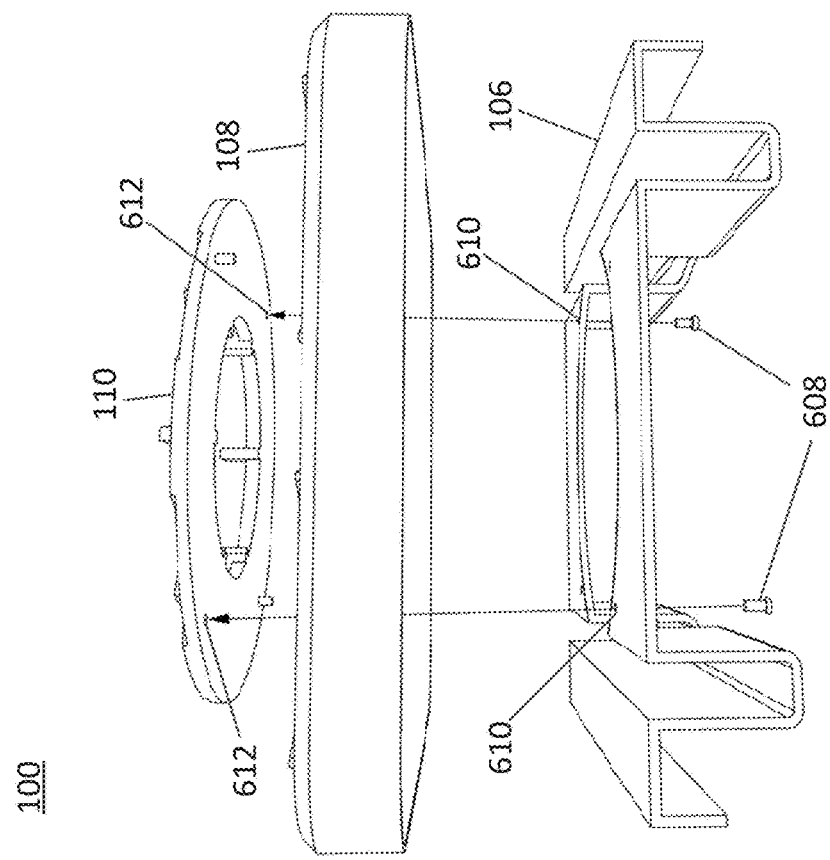
FIG. 6B is a bottom exploded view of a portion of the collapsible stove according to an embodiment of the disclosure.
Figure 6A:
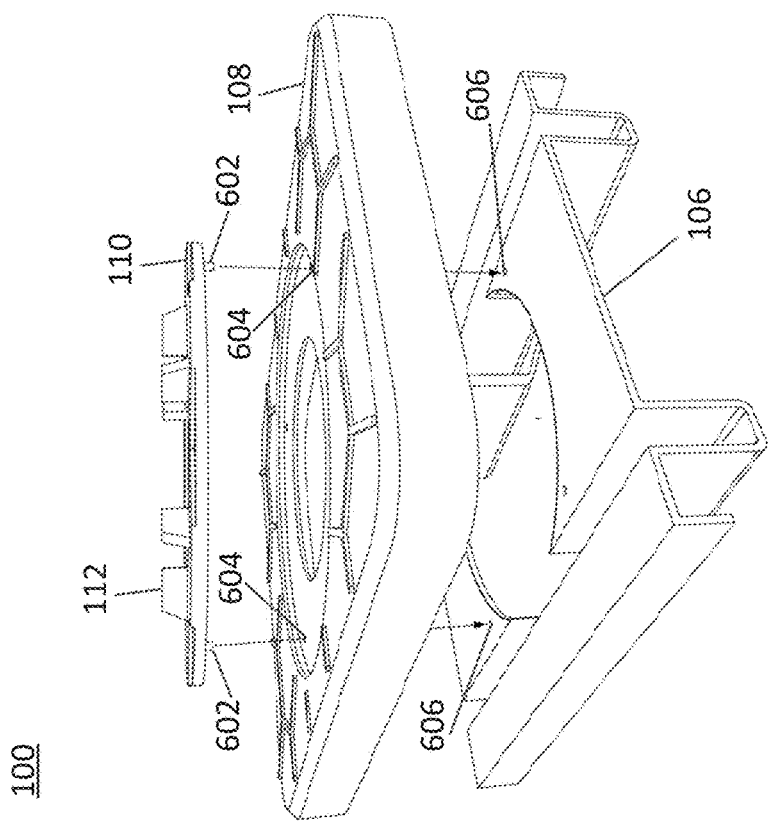
FIG. 6A is a top exploded view of a portion of the collapsible stove according to an embodiment of the disclosure.

Referring also to FIGS. 6A and 6B, the top cover 108 and top plate 110 can be secured to the frame 106. For example, the top cover 108 can be positioned on the frame 106 and the top plate 110 positioned on top of the top cover 108. The top cover 108, top plate 110, and frame 106 can then be secured together, for example using screws, c-clips, bayonet mounts, and other connectors. For example, as illustrated in FIG. 6B, screws 608 pass through thru holes 610 in the frame 106 and thru holes (not shown) in the top cover 108 and into threaded screw holes 612 in the top plate 110. For ease of assembly, a combination of pegs and holes can be used in combination with connectors. One or more pegs can be fixably attached to one of the top plate 110, the frame 106, or the top cover 108 and be configured to enter into holes in the other parts. The pegs and holes can align and hold the top plate 110, frame 106, and top cover 108 in place and also align other holes for the connectors. For example, as illustrated in FIG. 6A, pegs 602 in the top plate 110 pass through thru holes 604 in the top cover 108 and into holes 606 in the frame 106. One or more connectors can then be used to secure the parts together as described above and as illustrated in FIG. 6B. Easily removable connectors, such as bayonet mounts, can be used in combination with pegs and holes to make it easier for the user to take the pieces apart for maintenance and cleaning, especially in the field where a user may not have tools available or easily accessible.

Figure 4A:
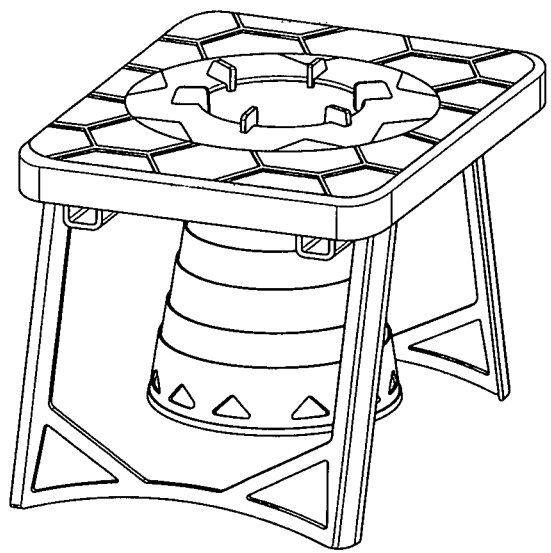
FIG. 4A is a top perspective view of a collapsible stove in an opened configuration according to an embodiment of the disclosure.
Figure 4B:
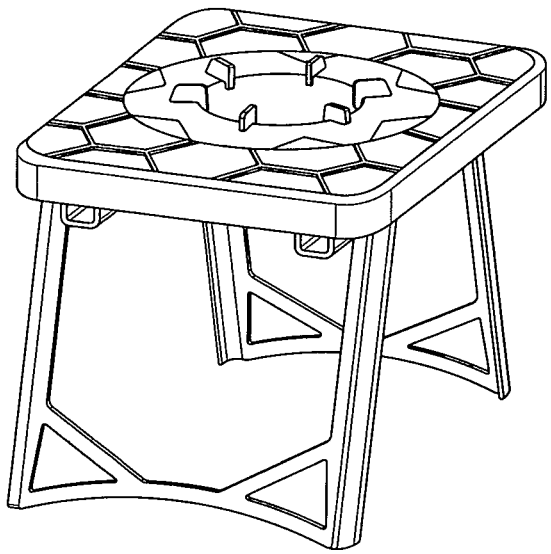
FIG. 4B is a top perspective view of the collapsible stove of FIG. 4A in a partially collapsed configuration according to an embodiment of the disclosure.
Figure 4C:
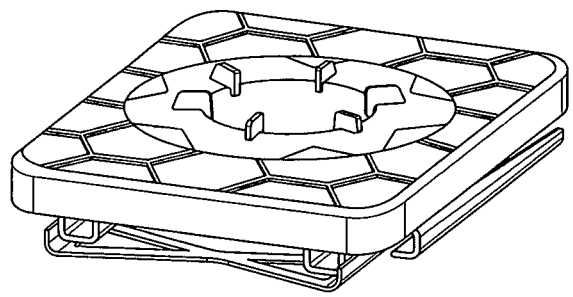
FIG. 4C is a top perspective view of the collapsible stove of FIG. 4B in a fully collapsed configuration according to an embodiment of the disclosure.

In different embodiments, the top cover 108, top plate 110, and frame 106 can be individual pieces or can be combined into one or more pieces as would be understood in the art. In the embodiment presented in the associated FIG. s, the top cover 108, top plate 110, and frame 106 are individual pieces. This embodiment advantageously takes advantage of different materials to reduce cost, reduce weight, add strength, improve durability, and improve temperature control. For example, the top cover 108, frame 106, and legs 102, 104 can be constructed of stamped aluminum, and can include ridges and other structural features, for example as illustrated in FIG. 4A-4C, to improve stiffness without substantially adding weight. Keeping the top cover 108 separate from the top plate 110 advantageously reduces substantial heat transfer from the top plate 110 and the associated combustion chamber 114 to the top cover 108, thereby reducing the likelihood of accidental burns to users during use and providing a cooler surface for placement of utensils or food preparation activities such as cutting. The combustion chamber 114 can be constructed of a suitable lightweight high temperature material such as stainless steel. The top plate 110 and stand off 112 can be constructed of cast aluminum that provides both durability and ample heat conduction to an associated pot, pan, or plate.

The top plate 110 can include a plurality of stand offs 112. The stand offs 112 can elevate a pot, pan, or plate that is placed on the stand offs 112. The stand offs 112 allow an air gap between top plate 110 and the pot, pan, or plate for exhaust gasses to escape from the combustion chamber 114. In a configuration, the stand offs 112 can be integrated into the top plate 110, for example as a single cast part. In another configuration, the stand offs 112 can be removable or configured to fold down or rotate into the combustion chamber 114 to further reduce space or to allow a pot or pan to be placed over the combustion chamber 114 to help extinguish any burning material therein.

The combustion chamber 114 can be secured to the top plate 110, for example using a bayonet mount, a screw thread, individual screws, or a permanent affixation such as welding. The combustion chamber 114 is comprised of a plurality of concentric rings 116, for example tapered annular or cylindrical rings as shown. The rings 116 are configured such that a lower portion of each ring 116 has a larger diameter than an upper portion of an adjacent ring 116. In this way, when the rings 116 are allowed to expand, for example by the action of gravity, each ring 116 will hold the ring 116 below in place to form a substantially sealed combustion chamber 114 that has an approximately frustoconical shape. The frustoconical shape of the combustion chamber 114 not only concentrates heat at the top plate 110, but also advantageously takes advantage of the Venturi effect to draw ample air into the combustion chamber 114 to increase combustion and heat production. One or more rings 116 can include a plurality of ventilation holes 120 for drawing air into the combustion chamber 114. The ventilation holes 120 can be configured to allow air to enter the combustion chamber 114, or allow ash to be removed, while keeping burning material and hot coals safely inside of the combustion chamber 114. The ventilation holes 120 can be approximately triangular in shape as illustrated. A bottom plate 122 can be secured to the lowest ring 116 to retain burning material, for example using screws, threads, or other means of securing as described above. The bottom plate 118 also can include ventilation holes 118. The bottom plate 122 can have a larger diameter than the diameter of any ring 116 and advantageously assist in securing the rings 116 when the combustion chamber 114' is in the collapsed configuration.

The combustion chamber 114' can be collapsed into a collapsed configuration as shown in FIG. 1B. When collapsed the rings 116 nest inside one another. In this way, the combustion chamber 114' reduces to a height approximately equal to that of the rest of the collapsible stove 100. The first leg 102 can be rotated from the open position to the closed position as shown in FIG. 1C. The second leg 104 can be similarly closed. One or both of the legs 102, 104 can secured the combustion chamber 114' in the collapsed configuration, for example by having a portion of a leg 102, 104 overlap part of the combustion chamber 114'. Advantageously, the combustion chamber 114' will not open or expand until one or both of the legs 102, 104 are opened.

Advantageously, the tapered cylindrical sections or rings 116 of the combustion chamber 114' can be nested into a compact configuration for ease of storage and carrying of the collapsible stove 100. A user can collapse the sections into the compact configuration by hand or by turning the stove upside down and allowing the rings 116 to collapse by the action of gravity. This might be performed, for example, when emptying the combustion chamber of ash or leftover unburned fuel prior to storage. Once the combustion chamber 114' is collapsed, the user can close the legs of the collapsible stove 100 to secure the collapsed rings 116 in place for storage and carrying. In an embodiment, the tapered cylindrical sections or rings 116 of the combustion chamber 114 can include structures for locking the rings in the open configuration. For example, each ring can include screw threads or bayonet mounts for locking each ring with an adjacent ring.

Figure 2A:
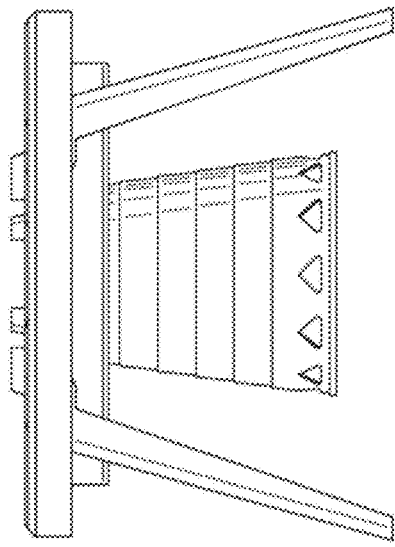
FIG. 2A is a side view of a collapsible stove in an opened configuration according to an embodiment of the disclosure.
Figure 2B:
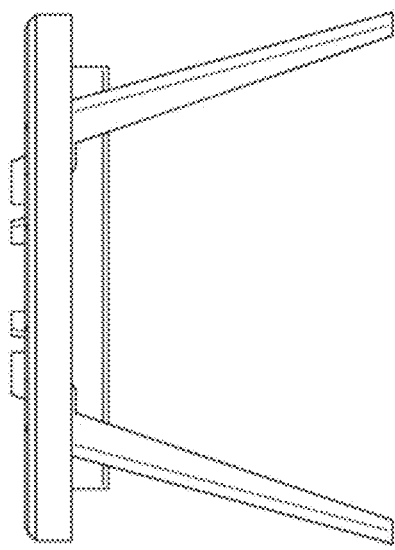
FIG. 2B is a side view of the collapsible stove of FIG. 2A in a partially collapsed configuration according to an embodiment of the disclosure.
Figure 2C:
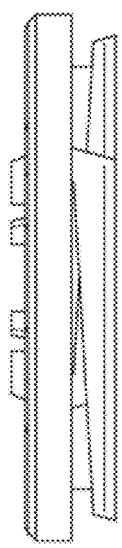
FIG. 2C is a side view of the collapsible stove of FIG. 2B in a fully collapsed configuration according to an embodiment of the disclosure.

FIGS. 2A, 2B, and 2C illustrate side views of the collapsible stove of FIGS. 1A, 1B, and 1C. FIGS. 3A and 3B illustrate top and bottom views of the collapsible stove 100 respectively. In the top view of FIG. 3A, the top cover 108 includes ridges 302 that can add structural support and stiffness to the top cover 108, or provide a distinctive decorative look. For example, the ridges 302 as illustrated form a hexagonal pattern. The choice of a hexagonal pattern, or any other desired pattern, can be selected for aesthetic or design reasons. However, any suitable shape of ridge 302 can be used to increase structural strength, and the ridge 302 can be configured to add strength while minimizing the amount of additional material and weight. The pattern of the ridges 302 can be partially carried to the top plate 110 as shown for decorative or design reasons.

In the bottom view of FIG. 3B, the first leg 102 is illustrated securing the combustion chamber in the collapsed configuration by overlapping a portion of the first leg 102 against the bottom plate 122. The ventilation holes 118 of the bottom plate 122 can be configured to allow ample air flow while retaining hot coals and allowing spent ash to be emptied. The ventilation holes 118 can be reinforced for added strength and heat resistance. The second leg 104 is illustrated as having a portion that fits between the frame 106 and first leg 102. By appropriately sizing portions of the first leg 102, the second leg 104, and the frame 106, the legs 102, 104 can be secured against one another or the frame 106 by friction, thereby facilitating the carrying and storing of the collapsible stove 100 in the collapsed configuration. In various configurations, indentations, detents, straps, springs, or other means of securing can be used in addition to, or instead of, friction as would be understood in the art.

Figure 5A:
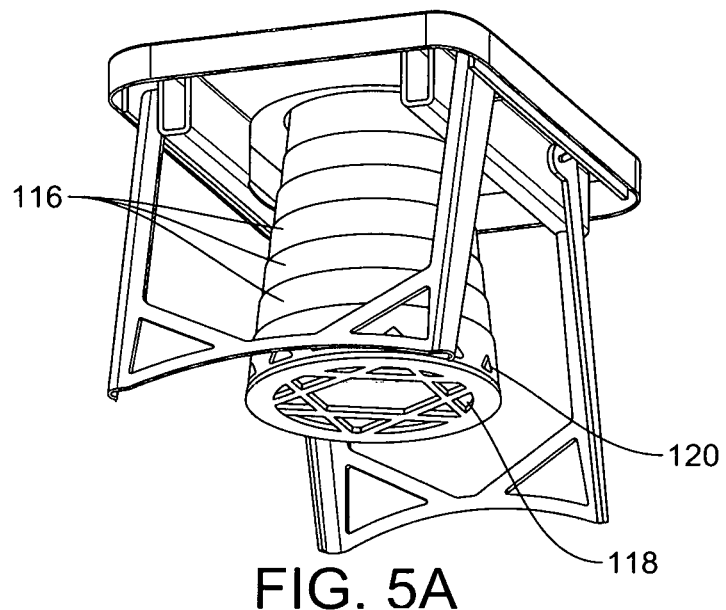
FIG. 5A is a bottom perspective view of a collapsible stove in an opened configuration according to an embodiment of the disclosure.
Figure 5B:
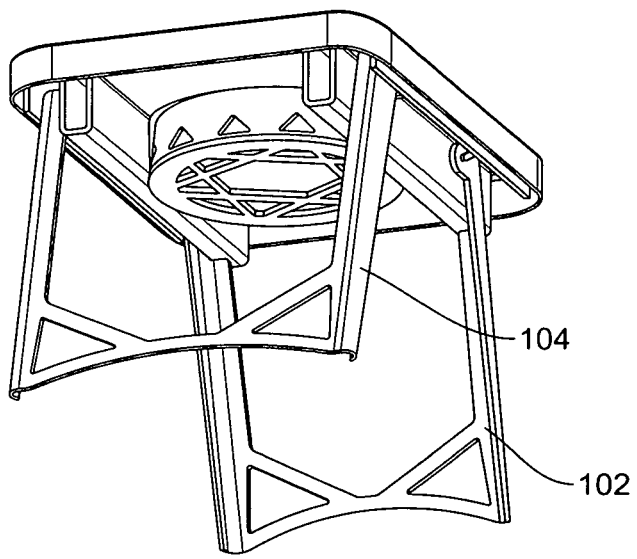
FIG. 5B is a bottom perspective view of the collapsible stove of FIG. 5A in a partially collapsed configuration according to an embodiment of the disclosure.
Figure 5C:
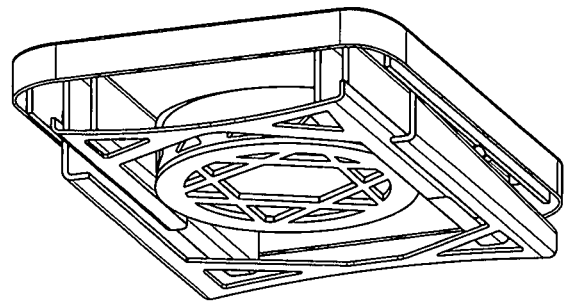
FIG. 5C is a bottom perspective view of the collapsible stove of FIG. 5B in a fully collapsed configuration according to an embodiment of the disclosure.

FIGS. 4A, 4B, and 4C similarly illustrate top perspective views of the collapsible stove of FIGS. 1A, 1B, and 1C. FIGS. 5A, 5B, and 5C similarly illustrate bottom perspective views of the collapsible stove of FIGS. 1A, 1B, and 1C.

Figure 7:
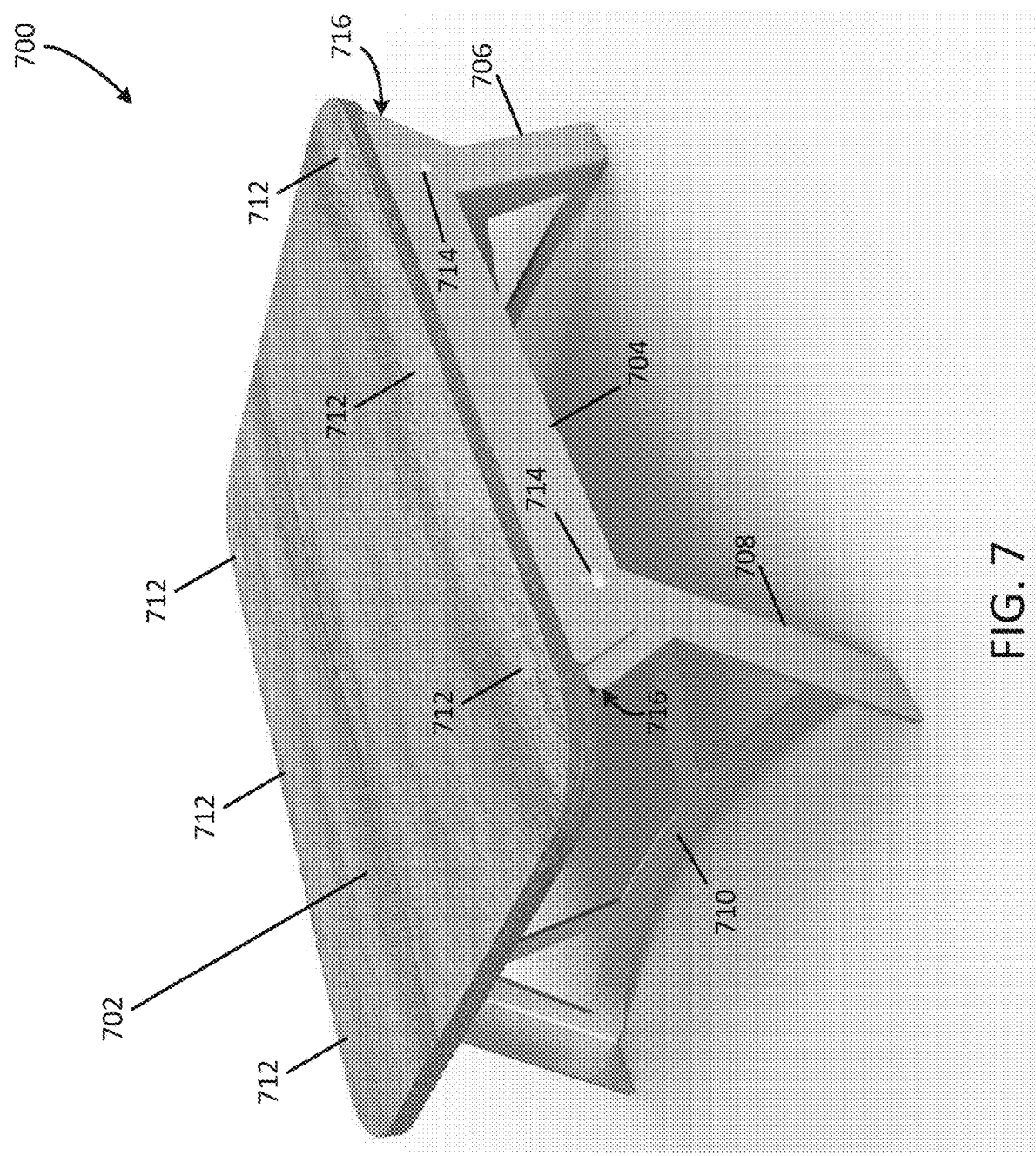
FIG. 7 is a perspective view of an embodiment of a prep table in a fully opened configuration.

FIG. 7 illustrates a perspective view of a first example preparation table, or prep table 700 in a fully opened configuration. The prep table 700 includes a prep surface 702 that has a depth of d, a frame 704 that can consist of one or more pieces, a first leg 706 and a second leg 708 (collectively legs 706, 708), leg support struts 710 associated with the first leg 706 and second leg 708, retainers 712 for securing the prep surface 702 to the frame 704, and retainers 714 for securing the first leg 706 and the second leg 708 to the frame 704. Example retainers 712, 714 can include, but are not limited to, pins, screws, bolts, rivets, and so forth. The retainer 712 and the retainer 714 can be similar or different from one another. The first leg 706 and second leg 708 are illustrated as fully extended. Triangular shaped stays 716, or detents, can be integrated into the legs 706, 708 to prevent the legs 706, 708 from overextending when rotated from a closed configuration into the fully opened configuration. In the fully opened configuration of the prep table 700, the stays 716 contact the frame 704, the prep surface 702, or both, to prevent further rotation of the legs 706, 708. In a configuration, the legs 706, 708 can rotate between about 90 and about 135 degrees from the initial closed position to provide a more stable platform. The leg support struts 710 similarly provide additional strength and stability to the legs 706, 708. The leg support struts 710 can be integrated into the legs 706, 708 or secured to the legs 706, 708. The prep surface 702 can be constructed using hardwood, bamboo, a wood veneer, composite materials, plastic, or any other suitable material or materials. The frame 704, legs 706, 708, and retainers 712, 714 can be constructed using a suitable metal, such as a lightweight metal such as titanium or aluminum, stainless steel, or any other suitable material, including but not limited to plastics or composite materials as would be understood in the art.

Figure 8:
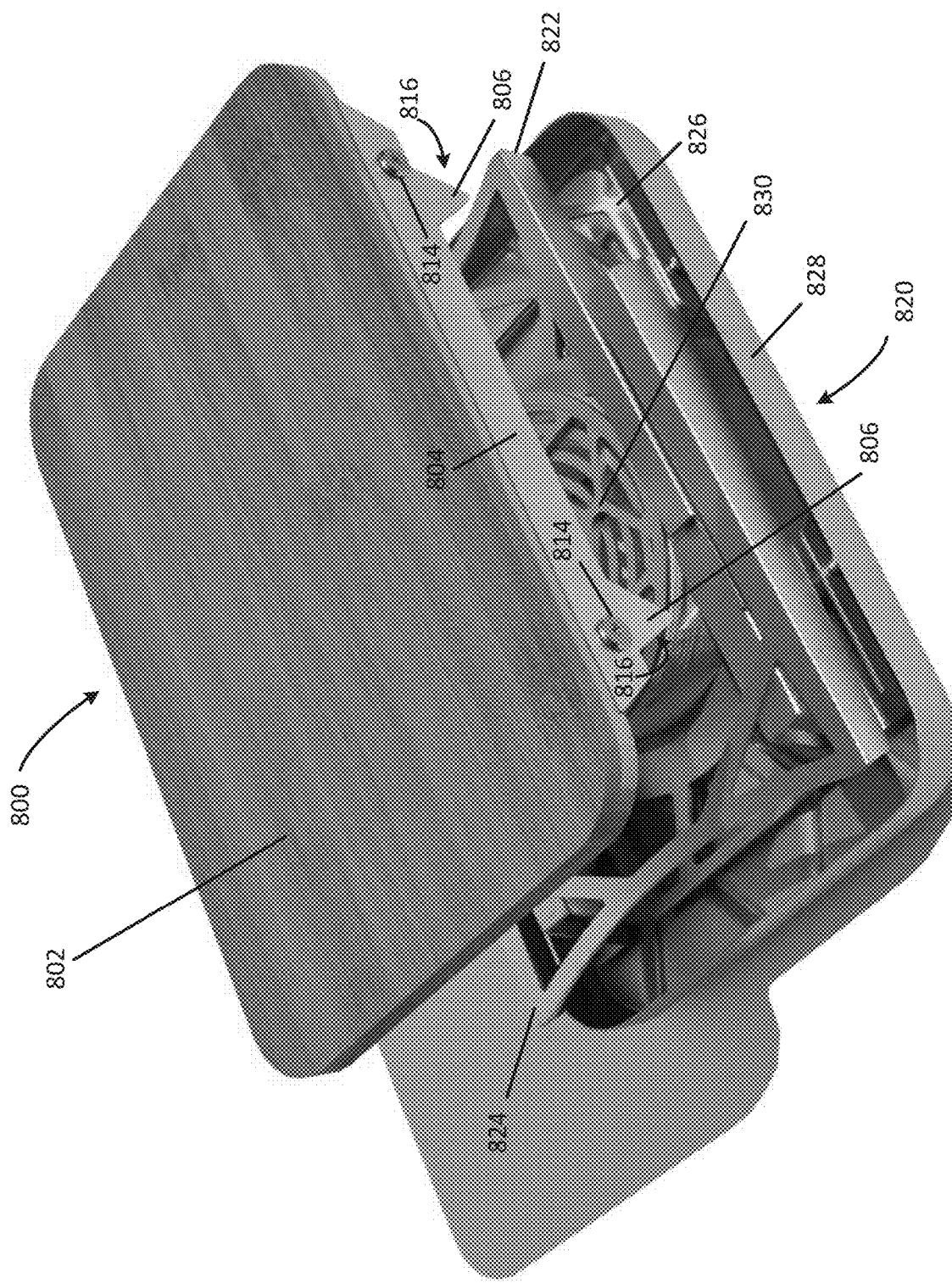
FIG. 8 is a perspective view of an embodiment of the prep table in a fully opened configuration positioned above an inverted collapsible stove in a fully collapsed configuration.

FIG. 8 illustrates a perspective view of a second example prep table 800 in a fully collapsed configuration. Similar to FIG. 7, the prep table 800 includes a prep surface 802, a frame 804, and a first leg 806 and a second leg 808 which are mostly hidden behind the frame 804 except for the stays 816. Suitable retainers 814 can be used to secure the legs 806, 808 to the frame 804. The frame 804 can be secured to the prep surface 802, for example using an adhesive such as a glue, or using screws secured to the underside of the prep surface 802. Advantageously, the prep surface 802 can be easier to maintain and keep clean if the retainers are not present on the top surface of the prep surface 802, in addition to adding to the aesthetics of the prep table 800.

The prep table 800 is illustrated positioned about a collapsible cooking stove 820, for example a collapsible cooking stove as illustrated in FIGS. 1-6B and described above. For purposes of exposition, the collapsible cooking stove 820 is illustrated in an inverted, or upside down, configuration. The collapsible cooking stove 820 includes a first leg 822, a second leg 824, a frame 826, a top cover 828, and a collapsed combustion chamber 830. The prep table 800 and collapsible cooking stove 820 are configured to nest with one another. Portions of the legs 806, 808 and stays 816 are configured to nest between the frame 826 and the top cover 828.

Figure 9:
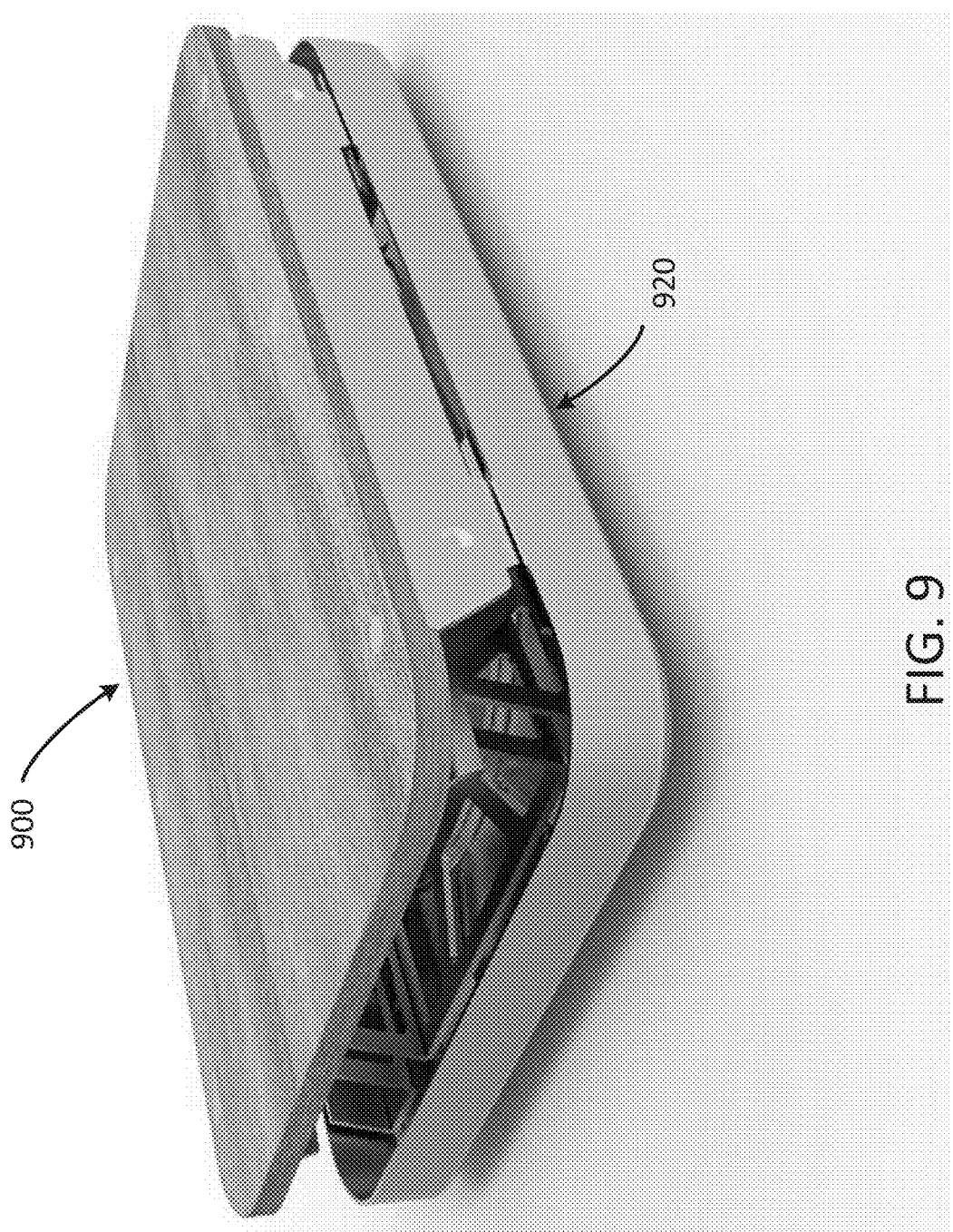
FIG. 9 is a perspective view of an embodiment of the prep table and the collapsible stove in a partially nested configuration.

FIG. 9 illustrates a perspective view of a third example prep table 900 in a partially nested configuration with a collapsible cooking stove 920.

Figure 10A:
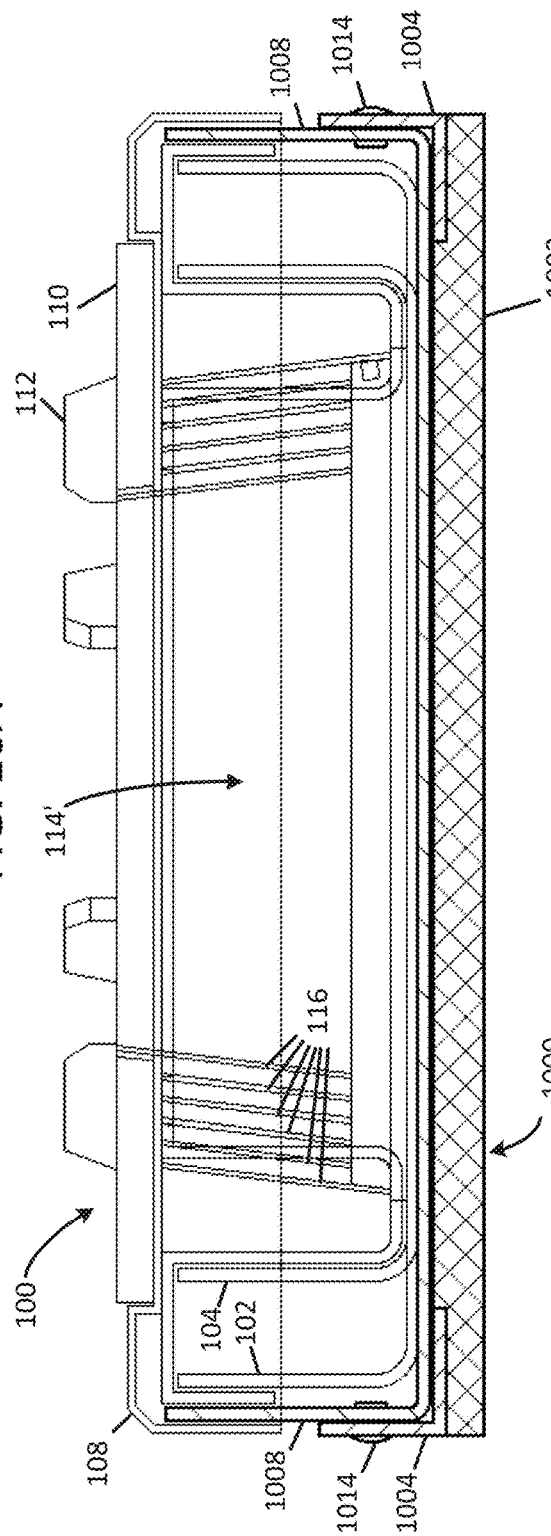
FIG. 10A is a section view of the prep table and the collapsible stove in a fully nested configuration.
Figure 10B:
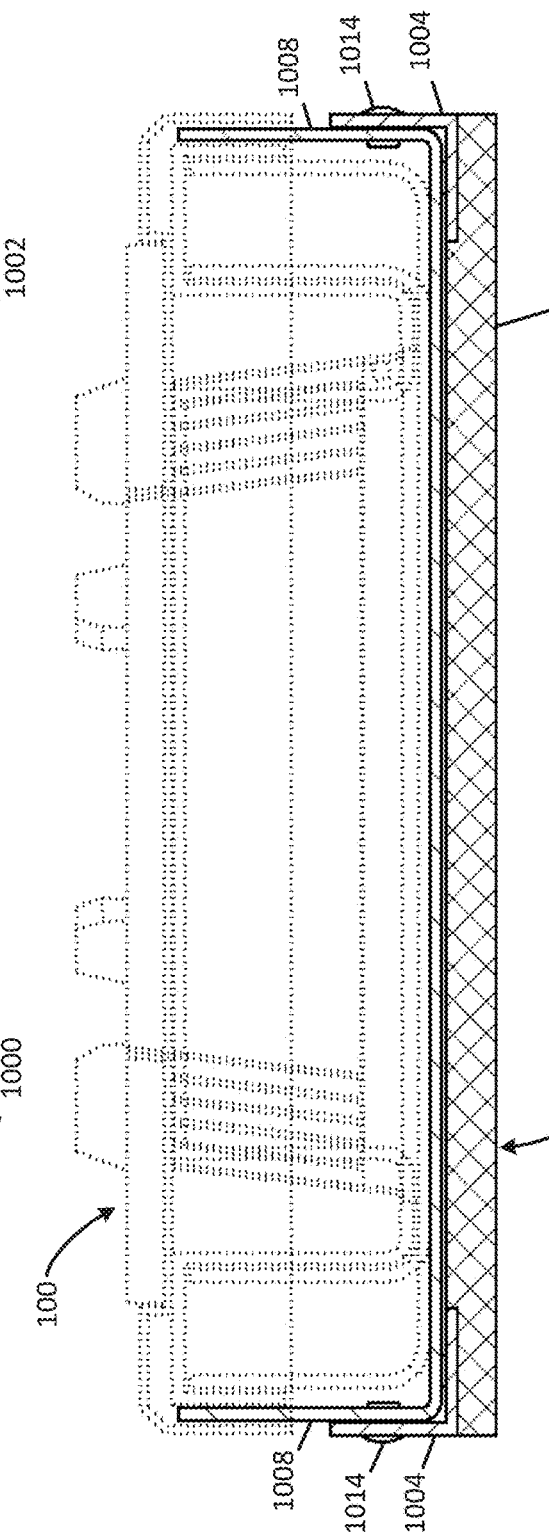
FIG. 10B is a section view of the prep table with the collapsible stove presented in broken lines.

FIG. 10A illustrates a section view of a prep table 1000 and the collapsible stove 100 of FIG. 1C in a fully nested configuration. The collapsible stove 100 includes a first leg 102, a second leg 104, a frame 106, a top cover 108, a top plate 110 with standoffs 112, and a combustion chamber 114' in the collapsed configuration comprising a plurality of concentric rings 116. The prep table 1000 includes a prep surface 1002 configured to accept one or more frames 1004. One of the legs, a first leg 1006, is secured to the one or more frames 1004 via retainers 1014. The first leg 1006 is shown to nest between the frame 106 and the top cover 108, and rest against the first leg 102 of the collapsible stove 100. FIG. 10B illustrates the section view of FIG. 10A with the collapsible stove 100 shown in dotted lines.

2. OPERATION OF THE PREFERRED EMBODIMENT

Advantageously, when nested with the collapsible stove 100, the prep table 1000 does not substantially contribute to the depth of the collapsible stove 100. Instead, the prep table 1000 adds merely the thickness of the prep surface 1002 plus the thickness of the leg 1006 which, being lightweight metal, means that the overall depth of the nested collapsible stove 100 and prep table 1000 is only increased, substantially, by the thickness of the prep surface 1000.

Also advantageously, when nested with the collapsible stove 100, the prep surface 1002 of the prep table 1000 provides a smooth bottom surface. The smooth bottom surface makes it easier to slide the collapsible stove 100 into and out of a carrying bag or travel bag, as otherwise the exposed legs 102, 104 and frame 106 of the collapsible stove 100 can snag or get caught up with the material of the bag. For the same reason, the smooth bottom surface also can make it easier to slide the collapsible stove 100 into or out of a backpack or other bag.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar caselaw or subsequent precedent should not be made if any future claims are added or amended to this Patent Application.

What is claimed is:

1. A preparation table comprising:
   a prep surface;
   one or more frames secured to the prep surface;
   a plurality of legs rotatably secured to the one or more frame such that when deployed, the legs support the prep surface;
   the legs are configured to collapse within the frames; and
   the frame is further configured to nest with a collapsible stove in a manner that the overall thickness of the collapsible stove nested combination with the prep surface is increased only by a thickness of the prep surface;
   wherein the collapsible stove comprises:
   a combustion chamber configured to burn a combustible material; and
   a plurality of tapered annular rings configured to telescope to form the combustion chamber when the collapsible stove is in an open configuration and collapse into a nested configuration when the collapsible stove is in a collapsed configuration.

2. The preparation table of claim 1, further comprising:
   a top plate displaced over the combustion chamber;
   wherein the top plate has an aperture open to the combustion chamber; and
   wherein the top plate is configured to support a cooking container over the aperture.

3. The prep table of claim 1, wherein each of said plurality of legs is configured to nest between the frame and the top cover of the collapsible stove when in a nested configuration.

4. The prep table of claim 1, wherein each of said plurality of legs is secured to the one or more frames using retainers.

5. The prep table of claim 1, wherein the collapsible stove is positioned in an inverted configuration when nested with the prep table.

6. The prep table of claim 1, wherein the prep surface is constructed of a material selected from hardwood, bamboo, wood veneer, composite materials, or plastic.

\* \* \* \* \*